United States Patent
McClure et al.

(10) Patent No.: US 6,927,370 B2
(45) Date of Patent: Aug. 9, 2005

(54) ELECTROMAGNETIC HEMMING MACHINE AND METHOD FOR JOINING SHEET METAL LAYERS

(75) Inventors: John L. McClure, Rochester Hills, MI (US); Suresh C. Ramalingam, Troy, MI (US); James P. Lezotte, Oxford, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/719,583

(22) Filed: Nov. 21, 2003

(65) Prior Publication Data

US 2005/0109769 A1    May 26, 2005

(51) Int. Cl.[7] ............................. B23K 13/01; H05B 6/10

(52) U.S. Cl. .................. 219/603; 219/633; 219/659

(58) Field of Search ........................ 219/603, 633, 219/634, 656, 659, 673–676, 602; 72/56–57, 72/313–316, 381, 413, 460–461; 29/419.2; 156/273.7, 274.2, 380.2

(56) References Cited

U.S. PATENT DOCUMENTS

| | | | |
|---|---|---|---|
| 4,531,393 A * | 7/1985 | Weir | 72/56 |
| 4,602,139 A * | 7/1986 | Hutton et al. | 219/603 |
| 4,950,348 A * | 8/1990 | Larsen | 219/633 |
| 5,365,041 A * | 11/1994 | Shank | 219/633 |
| 5,647,243 A | 7/1997 | Zampini | |
| 5,783,298 A | 7/1998 | Herring, Jr. et al. | |
| 5,826,320 A | 10/1998 | Rathke et al. | |
| 5,966,813 A | 10/1999 | Durand | |
| 6,052,887 A | 4/2000 | Dziadosz et al. | |
| 6,074,506 A | 6/2000 | Herring, Jr. et al. | |
| 6,365,883 B1 * | 4/2002 | Pohl | 219/634 |
| 6,389,697 B1 | 5/2002 | Benoit et al. | |
| 6,418,771 B1 | 7/2002 | Raffin et al. | |
| 6,427,510 B2 | 8/2002 | Schlafhauser et al. | |
| 6,578,401 B2 | 6/2003 | Baulier | |

* cited by examiner

Primary Examiner—Tu Hoang
(74) Attorney, Agent, or Firm—Ralph E. Smith

(57) ABSTRACT

A hemming machine for joining an inner sheet metal panel with an outer sheet metal panel comprising: a hemming tool containing an electromagnetic coil positioned to electromagnetically crimp and/or weld the outer sheet metal panel to the inner sheet metal panel, where a backing die positioned outside the inner metallic sheet and the outer metallic sheet opposite the electromagnetic coil.

12 Claims, 2 Drawing Sheets

ELECTROMAGNETIC HEMMING MACHINE AND METHOD FOR JOINING SHEET METAL LAYERS

FIELD OF THE INVENTION

This invention relates to an apparatus and method for joining sheet metal. More specifically, the invention describes a hemming apparatus employing an electromagnetic driver and a method for joining sheet metal layers.

BACKGROUND OF THE INVENTION

Auto body components such as doors, hoods, fenders, etc. are typically formed from two pieces of sheet metal hemmed together at the peripheral edges. Hemming involves folding the edge of one panel over the edge of the other panel. Often, the hemmed sheets are also welded, soldered, glued, sealed, bolted, riveted, etc. to provide an additional connection between the pieces of sheet metal and further seal the edge to provide structural integrity and prevent migration of dirt and moisture between the joined sheets.

Examples of bending and hemming machines and sealants for the hemmed panels are described in U.S. Pat. No. 5,647,243 (cam operated mechanical hemming machine), U.S. Pat. No. 5,783,298 (adhesive containing non-compressible beads for bonding hemmed panels), U.S. Pat. No. 6,052,887 (hemming machine incorporating a deformable hemming bead), U.S. Pat. No. 6,418,771 (interior perimeter hemming machine with nested dies), U.S. Pat. No. 6,427,510 (integrated bending and hemming machine), and U.S. Pat. No. 6,578,401 (a hemming machine having a nest adjustable via an inflatable bladder).

All mechanical hemming operations suffer from the same problem: mechanical bending produces deformities in the materials. Additionally, there are some quality issues pertaining to the relative positioning of the inner sheet material with respect to the outer sheet material. In the best case, the deformities are overcome with additional processing. In the worst case, the deformities destroy the integrity of the joint.

SUMMARY OF THE INVENTION

One object of the present invention is a hemming apparatus and method that does not produce deformities in the hemmed material.

These and other objects of the invention are satisfied by a hemming machine for joining an inner sheet metal panel with an outer sheet metal panel comprising: a hemming tool containing an electromagnetic coil positioned to electromagnetically crimp and/or weld the outer sheet metal panel to the inner sheet metal panel, where a backing die can be positioned outside the inner metallic sheet and the outer metallic sheet opposite the electromagnetic coil.

Other objects of the invention are accomplished by a method of electromagnetically hemming an inner sheet of metallic material with an outer sheet of metallic material comprising the steps of: mechanically hemming the inner sheet with the outer sheet; positioning a coil adjacent the hemmed inner sheet and outer sheet; mechanically crimping first and later welding contacting surfaces of the inner sheet and the outer sheet by pulsing current through the coil.

DETAILED DESCRIPTION

Figure 1:
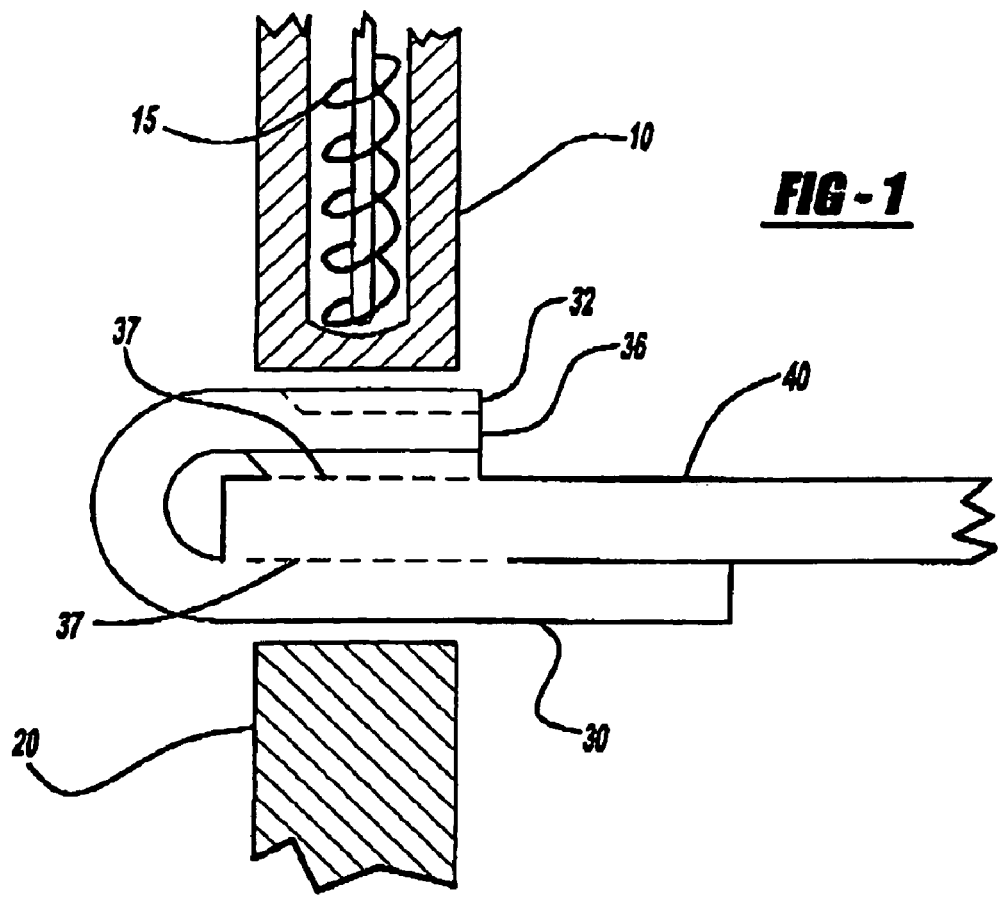
FIG. 1 is a schematic view of a hemming machine according to the present invention.

Electromagnetic forming (EMF) is based on the generation of Lorentz force, a repulsive force, that results from creating opposing magnetic fields in adjacent conductors. Generally, EMF is accomplished by directing a high current electric pulse resulting from the discharge of a capacitor bank into actuator coil. This pulse generates high intensity transient magnetic fields around the coil, which in turn induce eddy currents in a nearby, "work-piece" conductor. The work-piece conductor eddy currents are opposite to the magnetic fields around the coil which results in a repulsive force between the coil and the work-piece. A target piece is positioned on the opposite side of the work-piece from the actuator coil. The work-piece and the target piece are positioned so that the repulsive force generated by the pulse causes the work-piece to move toward the target piece at a high velocity. When the work-piece collides with the target piece, the two pieces are crimped, welded or molecularly bonded together, or a combination thereof. Specific details of electromagnetic forming are known in the art and are described in U.S. Pat. Nos. 6,561,722; 6,509,555; 6,389,697; and 5,826,320; the contents of which are specifically incorporated herein by reference.

In the present invention is useful for hemming any type of metal material or materials of the type useful for manufacturing vehicles. Such materials are, for example, steel, magnesium, and aluminum and alloys thereof. A particular advantage of the present invention is its ability to hem dissimilar materials such that they are crimped, welded or molecularly bonded to each other and thus have a seal that is impervious to migration of water, oil, dirt, or debris.

The present invention can be configured to work with any hemming machine known in the art designed to fold an outer piece over an inner piece of material. For example, the present invention is adaptable to work with machines designed to continuously hem one extruded piece to another, to move around the edge of two formed pieces, or to simultaneously hem two formed pieces. The present invention completely overcomes the "spring back" of the outer piece relative to the inner piece, (the focus of numerous attempts to bond, glue, etc, the pieces together) because the hemming machine employing an electromagnetic coil effectively crimps and/or welds the outer piece and the inner piece together. This creates positive lock between the inner and outer sheets to maintain geometric dimensioning and tolerancing that is particularly critical in creating the hem seals on the periphery of automotive closure panels. At present, costly two part (epoxy) adhesives are used to create these seals on most automotive closure panels. By adjusting the positioning of the head and/or the power of the pulse, it is possible to crimp, weld, or crimp and weld the outer piece to the inner piece in accordance with material type(s) and design and performance characteristics. Thus the costly and time consuming two part epoxy bonding process can be completely eliminated by the present invention, or replaced with a less expensive one part epoxy, if desired.

In the Figures, like number refer to like parts. FIG. 1 illustrates a schematic representation of a hemming machine according to the present invention, where the hemming tool 10 contains an electromagnetic coil 15 positioned to electromagnetically crimp, weld, or crimp and weld an outer sheet metal panel 30 to an inner sheet metal panel 40. Depending on the configuration of the machine, the materials being hemmed, the thickness of the materials, etc., it may also be desirable to configure use a backing die 20 positioned outside the outer sheet 30, the inner sheet 40, and opposite the tool 10 as shown in FIG. 1.

Figure 2:
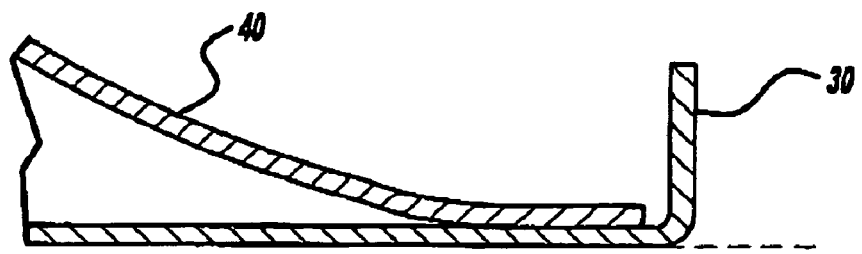
FIG. 2 is a cross section of an inner and outer piece where the outer piece is pre-bent.
Figure 3:
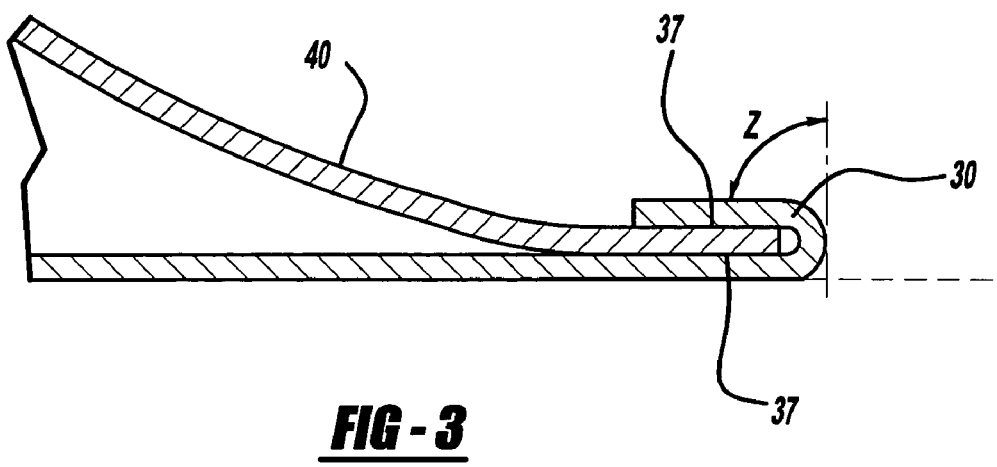
FIG. 3 shows the pieces of FIG. 2 following hemming using an electromagnetic hemming machine according to the present invention.

In operation, the hemming tool of the invention operates in the same manner as any conventional hemming machine or improvements thereof. While there are variations in the configuration of such machines, all are designed to accomplish the same operation. A hemming machine generally through hydraulics, mechanical action, or a combination thereof, bends an outer sheet 30 up (as seen in FIG. 2) and then bends it over an inner sheet 40 (as seen in FIG. 3).

Standard hemming machines accomplish a bend of X° (not shown) where the outer piece 32 is merely bent around the terminal portion of the inner sheet 30. The present invention finishes the hemming operation by sending a pulse to the electromagnetic coil incorporated into the hemming tool 10. This pulse forces the outer sheet 30 toward the inner sheet 40 at high velocity thereby displacing the inner sheet 36 and crimping, or welding, or crimping and welding the inner sheet 30 to the outer sheet 40 and accomplishing a bend of Z° where Z°>X°, and creating a molecular bond on the interfaces 37 between the inner sheet and the outer sheet. (Placement of the While the clearance between the adjacent surfaces of the inner sheet 40 and the outer sheet 30 can be adjusted as desired depending on the configuration of the hemming tool, material thickness, etc., it is generally believed that a clearance in the range of from 0.050" to 0.100" is acceptable. Following a hemming operation with the present invention, the distance between the outer sheet 30 and the inner sheet 40 is effectively zero.

The method of electromagnetically hemming an inner sheet of metallic material with an outer sheet of metallic material according to the present invention comprising the steps of: mechanically hemming the inner sheet with the outer sheet; positioning a coil adjacent the hemmed inner sheet and outer sheet; crimping and/or welding contacting surfaces of the inner sheet and the outer sheet by pulsing current through the coil.

As described in the Background of the invention, mechanical hemmers of various types and configurations are known in the art. Any of these may be used to accomplish this first step of mechanically hemming the inner sheet with the outer sheet. Once the mechanical hemming is complete, an appropriate coil for EMF is positioned adjacent the hemmed inner sheet and outer sheet. While the apparatus of the invention specifically describes incorporating the coil into the hemming tool (the head of the hemming machine that actually contacts the outer sheet and bends it around the inner sheet), it some circumstances it may be more efficacious to locate the coil in the hemming machine in a separate location. In such a machine, the hemming tool could be moved along with the sheets and the coil would be positioned on the hemming machine to deliver an EMF after the hem was completed to crimp and/or weld the contact surfaces of the inner sheet and the outer sheet when current was pulsed through the coil.

It is to be understood that although the invention has been described with particular reference to specific embodiments thereof, the forms of the invention shown and described are to be taken as a non-limiting embodiment and various changes and modifications may be made to the invention without departing from its spirit and scope as defined by the claims.

What is claimed is:

1. A hemming machine for joining an inner sheet metal panel with an outer sheet metal panel comprising:
    a hemming apparatus arranged to mechanically fold a portion of said outer sheet metal panel over a portion of the inner sheet metal panel; and
    an electromagnetic coil positioned relative to the hemming apparatus and arranged to selectively apply an additional force to the folded portion of the outer sheet metal panel, wherein the combination of mechanically folding and applying the additional force crimps, welds, or crimps and welds said outer sheet metal panel to said inner sheet metal panel.

2. The hemming machine of claim 1, further comprising a backing die positioned outside said inner sheet metal panel and said outer sheet metal panel opposite said electromagnetic coil.

3. The hemming machine of claim 1, where said inner sheet metal panel and said outer sheet metal panel are composed of identical metallic materials.

4. The hemming machine of claim 1, where said inner sheet metal panel and said outer sheet metal panel are composed of dissimilar metallic materials.

5. The hemming machine of claim 1, where said inner sheet metal panel and said outer sheet metal panel are composed of identical metallic materials chosen from the group consisting of: steel, magnesium, aluminum, alloys of magnesium, and alloys of aluminum.

6. The hemming machine of claim 1, where said inner sheet metal panel and said outer sheet metal panel are composed of dissimilar metallic materials chosen from the group consisting of: steel, magnesium, aluminum, alloys of magnesium, and alloys of aluminum.

7. A method of electromagnetically hemming and inner sheet of metallic material with an outer sheet of metallic material comprising the steps of:
    mechanically folding a portion of said outer sheet over a portion of said inner sheet;
    positioning an electromagnetic coil relative to said inner sheet and outer sheet;
    selectively applying an additional force to the folded portion of said outer sheet by pulsing current through said electromagnetic coil, wherein the combination of the mechanical folding and applying the additional force crimps, welds, or crimps and welds said inner sheet to said outer sheet.

8. The method of claim 7, further comprising the step of: positioning a backing die outside said inner sheet and said outer sheet opposite to said electromagnetic coil prior to said applying additional force step.

9. The method of claim 7, where said inner sheet and said outer sheet are composed of identical metallic materials.

10. The method of claim 7, where said inner sheet and said outer sheet are composed of dissimilar metallic materials.

11. The method of claim 7, where said inner sheet and said outer sheet are composed of identical metallic materials chosen from the group consisting of: steel, magnesium, aluminum, alloys of magnesium, and alloys of aluminum.

12. The method of claim 7, where said inner sheet and said outer sheet are composed of dissimilar metallic materials chosen from the group consisting of: steel, magnesium, aluminum, alloys of magnesium, and alloys of aluminum.

* * * * *